UNITED STATES PATENT OFFICE.

RIDSDALE ELLIS, OF OAK PARK, ILLINOIS, ASSIGNOR OF FIVE PER CENT TO PAUL CARPENTER, OF CHICAGO, ILLINOIS.

SEPARATING PROCESS.

1,425,187.　　　　　Specification of Letters Patent.　　Patented Aug. 8, 1922.

No Drawing. Application filed August 20, 1915, Serial No. 46,456. Renewed April 25, 1921. Serial No. 464,257.

*To all whom it may concern:*

Be it known that I, RIDSDALE ELLIS, a citizen of the United States, and a resident of Oak Park, in the county of Cook and State of Illinois, have invented certain new and useful Improvements in Separating Processes, of which the following is a specification.

This invention relates to processes for concentrating parts of comminuted masses of composite character, such as metalliferous ores, by treating the comminuted mass with a fluid adapted to aid in the movement of certain of the comminuted particles relatively to others having different qualities.

My invention is especially adapted and designed for concentrating ores whose metalliferous constituents include oxygen compounds of the valuable metal, such as oxides, carbonates and in some cases weathered or roasted sulphides which have hitherto resisted all attempts at separation on a commercial basis by means of the flotation apparatus employed for separating sulphides, or other metalliferous compounds, from gangue.

I have found that carbonates and oxides in contact with water, if not possessing a positive electric charge when found in their natural state, very readily acquire a strong positive charge when treated with acids, acid salts and salts of polyvalent metals. The oxides and carbonates of copper and other metals as found in nature are substantially never pure, the oxide always containing a certain amount of a salt of the metal and the carbonate some oxide or hydroxide. Likewise, basic sulphates produced by the weathering of sulphide ores have a similar mixed composition. Whether the metalliferous matter is principally oxide, carbonate or sulphate, the tendency is for the metalliferous salts in such matter when in contact with water to become hydrated and give off carbonic, sulphuric, or other acid which goes into solution in the immediate neighborhood of the surface of the material, and if a sufficient quantity of hydrogen ions are so liberated they give a positive charge to that surface. As an example of the above may be cited the case of ferric hydroxide produced by the dialysis of a ferric chloride solution which has been fully investigated under ideal conditions. The first product of the dialysis consists of agglomerates of iron combined with OH and Cl in varying proportion. If this product is allowed to stand, free hydrochloric acid is produced and the particles in the solution become strongly positively charged, and at the same time smaller in size in view of the fact that the size of the particles in a colloidal solution or suspension is in inverse ratio to the contact potential at their surface. Similarly all metallic oxides, carbonates and basic salts tend to acquire in pure water a strong positive charge.

I have found that colloidal ferric hydroxide can be precipitated by means of an oil emulsion which is negatively charged. I have also found when using these substances that anything approaching complete precipitation occurs only within fixed concentration limits so that it is necessary that the amount of oil and the amount of ferric hydroxide should be carefully proportioned to secure even approximately complete precipitation. The probable explanation is that when too much colloidal ferric hydroxide is added, the charge on the globules becomes too strongly positive for further precipitation to occur with the result that a further quantity of oil emulsion has to be added to bring about the precipitation.

When, however, a colloidal solution of ferric hydroxide and an oil emulsion are mixed and a coagulant is added which will itself coagulate the ferric hydroxide, no such limits are observed, and in all cases the coagulation of the hydroxide occurs on the surface of the oil globules with the result that the coagula consist of oil globules bound together by precipitated hydroxide. The same result is obtained when basic salts, such, for example, as basic carbonates or sulphates are precipitated in an emulsion. On the other hand, if aluminum silicate is precipitated in an oil emulsion, no such precipitation on the surface of the oil globules occurs. Similarly if an oil emulsion is shaken up with a mixture of basic salts and silicates, I find that the particles of basic salt adhere to the oil globules while the silicates do not so adhere.

Now I have found that finely divided carbonates, oxides and basic salts possess an affinity for oil to such an extent that they can under suitable conditions be used as emulsifying agents. In other words the carbonates tend to gather at the oil-water interface instead of becoming entirely wetted by the oil as in the case of sulphides. In such cases the quantity of oil employed is considerably greater than that usually used in connection with flotation work, since the particles of oil when they have been coated with the oxide or carbonate particles fail to attract more of the particles. When, however, a coagulant is added for the carbonate or other similar metalliferous compound, a relatively small amount of oil can be made to take up substantially all the carbonate or other similar metalliferous compound present.

Broadly my invention, therefore, includes the coagulation of the metalliferous constituents of a carbonate, oxide or similar ore in the presence of a fluid having a preferential affinity for certain of the particles. It should be understood that my improvements are applicable to processes employing either gaseous, or liquid substances, especially oil, and more particularly mineral or vegetable oil, for separating the metalliferous particles of the above-mentioned ores from the gangue, as well as for other purposes.

More particularly my invention relates to processes for concentrating the above-mentioned ores by means of the preferential affinity of an oily liquid for the metalliferous particles, in which process the particles of metalliferous matter are floated by means of the combined action of oil and gaseous bubbles.

My invention, in one manner of carrying it into effect, involves the employment of electrolytes to produce coagulation of the metalliferous constituents in the presence of oil and of air introduced into the mass by violent agitation. The electrolytes added should be capable of giving anions having a coagulating effect superior to that of anions of monobasic acids, such as hydroxyl ions or polyvalent anions, and preferably anions having a valence greater than two. Alkalies may be employed on account of the relatively great effect of the hydroxyl ion as compared with other monovalent anions.

The anion is one of the most important factors in the flotation of carbonates, oxides or basic salts since these compounds readily acquire a positive charge when in contact with water. So far as the relative values of individual anions is concerned, I have found that the effectiveness of the anions increases rapidly with their valence, the quadrivalent pyrophosphate ion, for example, being more effective than the trivalent phosphate ion not only as regards recoveries, but also as regards the quantities of salt needed to produce the best results.

However the valence of the ions is not the only factor which has to be considered as the effect of an ion in charging or discharging an electrically charged surface depends also upon the mobility of the ion. Now the transference number of an ion gives a measure of the relative mobility of a given ion as compared with other ions, and examination of transference numbers for a number of ions indicates that the atomic weight of the ions is not the only, and in some instances not even the principal, factor which determines the mobility of the ion. This is due to the fact that practically all ions are hydrated to a greater or less extent. For instance, the hydrogen ion has two waters of hydration, the potassium ion 9.6 waters of hydration, while the lithium ion has twenty-four waters of hydration. This attached water has of course the effect of slowing up the motion of the ion in solution so that whereas the hydrogen ion with an ionic weight of 1 has a mobility of 318, the potassium ion with an ionic weight of 39 a mobility of 65.3, the lithium ion with an ionic weight of 7 has a mobility of only 33.4. Other things being equal, therefore, ions having a high mobility should be selected where it is desired to reduce a charge of opposite sign to that carried by the ion, or to produce or increase a charge of the same sign.

In addition to the valence of the ions and their size, there is also a further factor to be considered, namely, the degree of dissociation of the salt added. In general, it is advisable to employ those salts which are highly dissociated when dissolved in water. In the case of salts of weak polybasic acids the degree of dissociation depends to some extent on the concentration of hydrogen ions in solution, since the amount of polyvalent, and particularly tri and quadrivalent anions present in solution depends in part on the concentration of the hydrogen ions present. A certain amount of the polybasic acid corresponding to the anion of the salt added is always formed and this dissociates progressively. When such an acid or its salt dissociates, a relatively much larger amount of monovalent anions are formed than divalent, and if the acid is tri-basic or quadribasic, the amounts of the various anions produced is in inverse ratio to the valence of the anions. Orthophosphoric acid, for example, is a weak tribasic acid, the dissociation constant for the first hydrogen ion being $1.1 \times 10^{-2}$, that for the second hydrogen ion being $2 \times 10^{-7}$, while that for the third hydrogen ion is $3.6 \times 10^{-13}$. If, therefore, acid is added to a solution which contains a neutral orthophosphate the dissociation is driven back with the result that the number of divalent and trivalent anions is greatly reduced. As, however, in the flotation of carbonates, oxides and similar ores, the polyvalent anions are the important factor, the presence of a considerable amount of hydrogen ion is to be avoided.

Pyrophosphoric acid on the other hand is a strong acid so that the addition of acid to its salts has relatively little effect on the number of polyvalent anions produced as compared with the effect of acid on salts of weak polybasic acids.

Pyrophosphoric acid, although having four hydrogens appears to dissociate in two stages only and the salts of this acid even in neutral or alkaline solution appear to yield more quadrivalent anions than orthophosphates do trivalent anions. Consequently I prefer to employ pyrophosphates as they give a greater number of higher valent anions than do orthophosphates under all conditions.

Not only do the hydrogen ions reduce the number of polyvalent anions present, but they further tend to increase the positive charge on the particles of carbonate, etc. and so inhibit the action of the greatly reduced number of polyvalent anions. Consequently I prefer to employ neutral solutions of such salts or solutions made alkaline with a hydroxide of another metal to avoid the common ion effect. In a neutral solution the hydrogen ion concentration is $10^{-7}$, whereas in a solution containing 0.25% of sulphuric acid, the hydrogen ion concentration (assuming complete dissociation) is $5 \times 10^{-2}$ or 500,000 times the concentration in a neutral solution. As the product of the hydrogen ion concentration and the hydroxyl ion concentration is always $10^{-14}$, by adding alkali the concentration of hydrogen ions can be reduced to a value well below $10^{-7}$.

I have found, for example, using $NaH_2PO_4$ that instead of producing coagulation of the carbonates, it has a reverse effect tending to form a semi-colloidal solution which contains a greater percentage of copper than the matter which settles rapidly on standing. Exactly similar results are obtained when sulphuric acid is added to a solution of sodium pyrophosphate.

The various forms of apparatus commonly employed for carrying out "oil flotation process," such, for example, as the "Hyde" apparatus of United States Patent No. 1,022,085, in conjunction with which, for purposes of illustration, I am describing my invention, are so well known to those skilled in the art that I do not here illustrate and describe such apparatus.

It is also well known to those skilled in the art that the exact proportions of oil, acid, and any other substances which may be used in such processes, vary somewhat according to the nature of the particular ore treated; therefore, I give, for purposes of illustration, the results of actual practice with a water deposited carbonate copper ore from Arlington, N. J., which contained about 2 per cent. of copper in a siliceous gangue.

The pulverized ore (90% through 80 mesh) was mixed with three times its weight of water and 0.5% by weight of oil (on the ore) was added. The oil used consisted of three parts of crude fuel oil to one part of creosote oil.

I found that the highest recoveries were obtained with the following percentages of sodium orthophosphate and sodium pyrophosphate, respectively:—

Sodium orthophosphate $Na_3PO_4$—0.10% (on the ore)
Sodium pyrophosphate $Na_4P_2O_7$—0.016%

Purer concentrates were obtained when the concentration of pyrophosphate was reduced to 0.008%, or when an equal amount of aluminum phosphate (and 0.007% of sulphuric acid to prevent precipitation of the aluminum) was added. The total amount of copper floated was slightly reduced.

Using sodium pyrophosphate, with a concentration of 0.008%, a concentrate was obtained which contained about 70% of the copper present. The percentage of copper in the first float was about 13.5% which was considerably greater than that of the succeeding float, and the percentage fell steadily as the number of floats increased. The total weight of concentrate obtained with ten successive floats was about one-fifth of the weight of the original ore as a considerable amount of gangue was floated with the carbonate and I prefer, therefore, to re-float in order to obtain a rich concentrate.

When the sodium pyrophosphate solution (0.008%) was acidified with sulphuric acid until the concentration of acid was 0.53%, the weight of concentrate obtained in ten floats was reduced to the weight obtained in seven floats with neutral solution and the copper floated was less than that obtained with seven floats in neutral solution. Not only does acid cut down very materially the amount and purity of the concentrate, but it is also disadvantageous in that the percentage of copper in the first float is less than one-third the percentage of copper in the first float obtained when using a neutral solution with the result that acid prevents a rich concentrate being obtained by collecting the first float or the first two or three floats separately and subjecting the remaining floats to re-flotation. Consequently I prefer to employ neutral or alkaline solutions of such a salt as sodium pyrophosphate in preference to acid solutions of such salts.

The amount of copper floated may be increased by using a larger amount of oil, but such increase in oil tends to increase the amount of gangue floated out of proportion to the increase in copper floated. Consequently I prefer to employ small amounts of oil, although in some cases it may be useful to employ larger amounts, particularly where the concentrate is subjected to one or more re-floatation treatments.

I have found that when the amount of oil employed, is increased, considerably larger initial floats are obtained, but that these floats contain substantially the same percentage of copper as the smaller floats obtained with a smaller amount of oil, and that the large amounts of gangue obtained with a large amount of oil are obtained in the later floats. Consequently I may in some cases add the oil in successive stages to keep down the amount of gangue floated and at the same time increase the recovery of copper.

While I have referred to the use of salts of phosphoric and pyrophosphoric acids, I may in some cases use salts of tetraphosphoric acids, such as $Na_6P_4O_{13}$ in order to obtain a hexavalent anion. Other anions having a high valence may be used provided they do not form insoluble compounds with the constituents of the ore. Ferro- and ferri-cyanides are in general not suitable for this purpose as the iron usually present in the ore causes precipitation of the cyanide.

Having thus described my invention and illustrated its use, what I claim as new and desire to secure by Letters Patent is:—

1. The process of concentrating ores whose metalliferous constituents include oxygen compounds of the metal to be separated which includes the separation of the said oxygen compounds from the other constituents of the ore by treating the comminuted ore with a fluid having a selective action for such oxygen compounds, and which further includes the use of a solution containing anions having a valence greater than two and cations having a valence greater than one for increasing the selective action of the fluid.

2. The process of concentrating ores whose metalliferous constituents include oxygen compounds of the metal to be separated which includes the separation of the said oxygen compounds from the other constituents of the ore by treating the comminuted ore with a fluid having a selective action for such oxygen compounds, and which further includes the use of a solution containing anions having a valence greater than three and cations having a valence greater than one for increasing the selective action of the fluid.

3. The processes of concentrating ores whose metalliferous constituents include oxygen compounds of the metal to be separated which includes the separation of the said oxygen compounds of the ore by treating the comminuted ore with a fluid having a selective action for said oxygen compounds, and which further includes the use of a solution containing anions having a valence greater than two and cations having a valence greater than two for increasing the selective action of the fluid.

4. The process of concentrating ores whose metalliferous constituents include oxygen compounds of the metal to be separated which includes the separation of the said oxygen compounds of the ore by treating the comminuted ore with a fluid having a selective action for said oxygen compounds, and which further includes the use of a solution containing anions having a valence greater than three and cations having a valence greater than two for increasing the selective action of the fluid.

5. The process of concentrating ores whose metalliferous constituents include oxygen compounds of the metal to be separated which includes the separation of the said oxygen compounds from the other constituents of the ore by treating the comminuted ore with a fluid having a selective action for said oxygen compounds, and which further includes the use of a solution having hydrogen ion concentration of less than $10^{-3}$ normal and anions having a valence greater than two for increasing the selective action of the fluid.

6. The process of concentrating ores whose metalliferous constituents include oxygen compounds of the metal to be separated which includes the separation of the said oxygen compounds from the other constituents of the ore by treating the comminuted ore with a fluid having a selective action for such oxygen compounds, and which further includes the use of a solution having a hydrogen ion concentration of less than $10^{-3}$ normal and anions having a valence greater than three for increasing the selective action of the fluid.

7. The process of concentrating ores whose metalliferous constituents include oxygen compounds of the metal to be separated which includes the separation of the said oxygen compounds from the other constituents of the ore by treating the comminuted ore with a fluid having a selective action for said oxygen compounds, and which further includes the use of a solution having a hydrogen ion concentration of less than $10^{-6}$ normal and anions having a valence greater than two for increasing the selective action of the fluid.

8. The process of concentrating ores whose metalliferous constituents include oxygen compounds of the metal to be separated which includes the separation of the said oxygen compounds from the other constituents of the ore by treating the comminuted ore with a fluid having a selective action for said oxygen compounds, and which further includes the use of a solution having a hydrogen concentration of less than $10^{-6}$ normal and anions having a valence greater than three for increasing the selective action of the fluid.

9. The process of concentrating ores whose metalliferous constituents include oxygen compounds of the metal to be separated which includes the agitation of the comminuted ore with a solution containing anions having a valence greater than two until a froth is formed which contains the said oxygen compounds, and the separation of the froth from the remainder by flotation.

10. The process of concentrating ores whose metalliferous constituents include oxygen compounds of the metal to be separated which includes the agitation of the comminuted ore with a solution containing anions having a valence greater than three until a froth is formed which contains the said oxygen compounds, and the separation of the froth from the remainder by flotation.

11. The process of concentrating ores whose metalliferous constituents include oxygen compounds of the metal to be separated which includes the agitation of the comminuted ore with a solution containing anions having a valence greater than two and cations having a valence greater than one until a froth is formed which contains the said oxygen compounds, and the separation of the froth from the remainder by flotation.

12. The process of concentrating ores whose metalliferous constituents include oxygen compounds of the metal to be separated which includes the agitation of the comminuted ore with a solution containing anions having a valence greater than three and cations having a valence greater than one until a froth is formed which contains the said oxygen compounds, and the separation of the froth from the remainder by flotation.

13. The process of concentrating ores whose metalliferous constituents include oxygen compounds of the metal to be separated which includes the agitation of the comminuted ore with a solution containing anions having a valence greater than two and cations having a valence greater than two, until a froth is formed which contains the said oxygen compounds, and the separation of the froth from the remainder by flotation.

14. The process of concentrating ores whose metalliferous constituents include oxygen compounds of the metal to be separated which includes the agitation of the comminuted ore with a solution containing anions having a valence greater than three and cations having a valence greater than two, until a froth is formed which contains the said oxygen compounds, and the separation of the froth from the remainder by flotation.

15. The process of concentrating ores whose metalliferous constituents include oxygen compounds of the metal to be separated which includes the agitation of the comminuted ore with a solution having a hydrogen ion concentration of less than $10^{-3}$ normal and anions having a coagulating effect superior to that of anions of monobasic acids until a froth is formed which contains the said oxygen compounds, and the separation of the froth from the remainder by flotation.

16. The process of concentrating ores whose metalliferous constituents include oxygen compounds of the metal to be separated which includes the agitation of the comminuted ore with a solution having a hydrogen ion concentration of less than $10^{-3}$ normal and anions having a valence greater than one until a froth is formed which contains the said oxygen compounds, and the separation of the froth from the remainder by flotation.

17. The process of concentrating ores whose metalliferous constituents include oxygen compounds of the metal to be separated which includes the agitation of the comminuted ore with a solution having a hydrogen ion concentration of less than $10^{-3}$ normal and anions having a valence greater than two until a froth is formed which contains the said oxygen compounds, and the separation of the froth from the remainder by flotation.

18. The process of concentrating ores whose metalliferous constituents include oxygen compounds of the metal to be separated which includes the agitation of the comminuted ore with a solution having a hydrogen ion concentration of less than $10^{-3}$ normal and anions having a valence greater than three until a froth is formed which contains the said oxygen compounds, and the separation of the froth from the remainder by flotation.

19. The process of concentrating ores whose metalliferous constituents include oxygen compounds of the metal to be separated which includes the agitation of the comminuted ore with an oily fluid having a preferential affinity for said metalliferous constituents and a solution containing anions having a valence greater than two until a froth is formed which contains the said metalliferous constituents, and the separation of the froth from the remainder by flotation.

20. The process of concentrating ores whose metalliferous constituents include oxygen compounds of the metal to be separated which includes the agitation of the comminuted ore with an oily fluid having a preferential affinity for said metalliferous constituents and a solution containing anions having a valence greater than three until a froth is formed which contains the said metalliferous constituents, and the separation of the froth from the remainder by flotation.

21. The process of concentrating comminuted masses, certain of whose constituents include oxygen compounds of a material to be separated, which includes the separation of said oxygen containing constituents from the other constituents of the mass by treating the comminuted mass with a fluid having a preferential affinity for said material to be separated, and which further includes the use of a solution containing anions having a valence greater than three for increasing the selective action of the fluid.

22. The process of concentrating ores whose metalliferous constituents include oxygen compounds of the metal to be separated which includes the separation of the ore by treating the comminuted ore with a fluid having a selective action for said oxygen compounds, and which further includes the use of a solution containing anions having a valence greater than two, said solution having a hydrogen ion concentration of less than $10^{-3}$ normal.

23. The process of concentrating ores whose metalliferous constituents include oxygen compounds of the metal to be separated which includes the separation of the said oxygen compounds from the other constituents of the ore by treating the comminuted ore with a fluid having a selective action for said oxygen compounds, and which further includes the use of a solution containing anions having a relatively high valence for increasing the selective action of the fluid, said solution having a hydrogen ion concentration of less than $10^{-3}$ normal.

In testimony whereof I have hereunto signed my name in the presence of the two subscribing witnesses.

RIDSDALE ELLIS.

Witnesses:
DONALD C. WILLIAMS,
WILLIAM GOLDBERGER.